Aug. 11, 1925.
L. J. MALONE
1,548,951
PROTECTED PHOTOGRAPHIC FILM
Filed June 29, 1923
FIG - 1 -
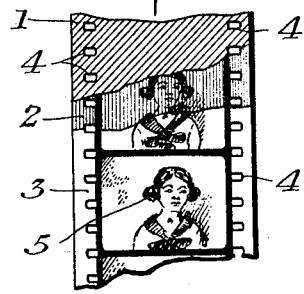
FIG - 2 -
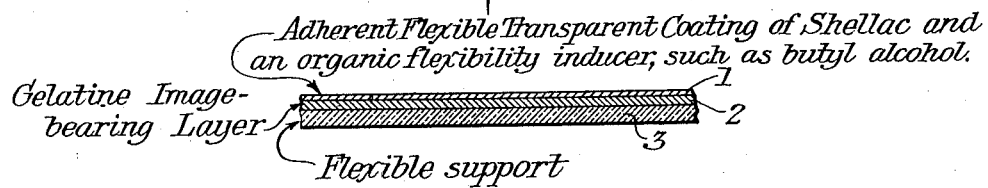
WITNESS
INVENTOR
Lester J. Malone,
BY
ATTORNEY Patented Aug. 11, 1925.

1,548,951

UNITED STATES PATENT OFFICE.

LESTER J. MALONE, OF ROCHESTER, NEW YORK, ASSIGNOR TO EASTMAN KODAK COMPANY, OF ROCHESTER, NEW YORK, A CORPORATION OF NEW YORK.

PROTECTED PHOTOGRAPHIC FILM.

Application filed June 29, 1923. Serial No. 648,573.

To all whom it may concern:

Be it known that I, LESTER J. MALONE, a citizen of the United States of America, residing at Rochester, in the county of Monroe and State of New York, have invented certain new and useful Improvements in Protected Photographic Films, of which the following is a full, clear, and exact specification.

This invention relates to protected photographic films and compositions for producing such protection. One object of the invention is to provide a flexible photographic film having a gelatin image-bearing layer with a protecting coating which is firmly adherent to the gelatin and is at the same time flexible and transparent. Another object of the invention is to provide a protected motion picture film in which the gelatin image-bearing layer is covered by an adherent, flexible, transparent coating which does not obstruct the usual sprocket-engaging marginal perforations. Another object of the invention is to provide a film varnish composition which will strongly adhere to the image-bearing face of a flexible photographic film, which will flow readily, dry quickly, give a hard smooth surface and yet remain flexible and transparent without increasing the inflammability of the film as a whole. Other objects will hereinafter appear.

In the accompanying drawing:

Fig. 1 is a fragmentary plan view of a motion picture film embodying my invention, parts being broken away for the sake of clearness;

Fig. 2 is a diagrammatic sectional view of a film embodying my invention, the parts being exaggerated for the sake of clearness.

As is well known, it is desirable to protect the gelatin image-bearing layers of flexible photographic films from scratching and dirt. Moreover, it is desirable that the protective coating for this purpose be one that can be washed with water, will be highly resistant to scratching, will be flexible and transparent and will not increase the inflammability of the film. It is likewise desirable that the coating material flow readily and dry quickly, so that the maximum capacity of the coating apparatus may be utilized. It is, moreover, useful to have the coating as thin as possible without impairing its protective qualities, in order that the passage of the film through the usual apparatus may not be impaired by excessive thickness. This is particularly true of motion picture film, the marginal perforations of which must also be kept substantially free from obstruction by the coating material.

I have discovered that a protective coating having the above mentioned desirable qualities can be prepared by using shellac and an organic substance of low volatility which enhances the flexibility of it, the two remaining together in a transparent layer in colloidized form. In the preferred embodiment of my invention I use as the flexibility-inducer for the shellac a lower monohydroxy aliphatic alcohol containing from 4 to 5 carbon atoms, such for example as butyl alcohol, isobutyl alcohol, amyl alcohol, isoamyl alcohol, or a mixture of two or more of these. Of course, equivalent softening materials of similar low volatility and flexibility-inducing qualities may be substituted. I have discovered that such substances, of which normal butyl alcohol is typical, induce flexibility without impairing the transparency and without preventing a firm adhesion between the protective coating and the gelatin image-bearing layer. These substances, moreover, have the property of giving the finished shellac layer a peculiarly smooth surface which is advantageous in the case of motion picture film which passes rapidly through projecting machines.

The compositions may vary widely and the following details are, therefore, given by way of illustration, except as indicated in the claims. The shellac should preferably be substantially free from moisture and wax, so that these materials will not be precipitated out when the shellac is dissolved and produce cloudiness or reduce transparency. In the case of motion picture films it is likewise desirable that the shellac be bleached so as to give a substantially colorless transparent coating. The ethyl alcohol, which is preferably used as a common solvent for the shellac and flexibility-inducing substance, may be the commercially pure substance or the more readily available denatured forms such as those containing the legally prescribed small amounts of methyl alcohol or pyridine, etc. The flexibility-inducing substance is preferably substantially free from moisture, any good clear butyl alcohol or fusel oil being useful, for instance.

By way of example, 100 parts by weight of shellac and 3 to 100 parts of a flexibility-inducing substance, say butyl alcohol, I dissolve in from 160 to 1900 parts of ethyl alcohol, pure or denatured. One formula which I have found to work very well in high speed coating machines is: 100 parts shellac by weight, 45 parts of butyl alcohol and 900 parts of denatured ethyl alcohol. This coats motion picture film satisfactorily at the rate of thirty feet per minute at 70 to 90° F. This gives a very thin coating which, however, has the desirable properties hereinabove enumerated.

These protective shellac coatings can, of course, be applied by hand using a brush or immersing the film, but are particularly useful when applied by any of the well known high speed film coating devices. The support for the gelatin image-bearing layer may, of course, be any suitable material, although in the preferred form of my invention I use transparent cellulosic film bases of nitrocellulose, acetyl cellulose or cellulose ether rather than paper, the latter, however, being useful. It will be apparent that the coating operation may readily be repeated if the first protective coating should in time become scratched. The coating is sufficiently resistant to water to be washable where the customary care is exercised in film finishing studios.

In Fig. 1 there is diagrammatically shown a fragment of motion picture film embodying my invention. Fig. 2 is a section showing the relation of the layers. The flexible support 1 carries a gelatin image-bearing layer 2, over which is the protecting coating 3 of shellac and flexibility-inducer. The usual sprocket-engaging marginal apertures are indicated at 4.

Having thus described my invention, what I claim as new and desire to secure by Letters Patent is:

1. A protected photographic film comprising a flexible support, a gelatin image-bearing layer on said support, and a flexible transparent protective coating over said layer and firmly adherent thereto, said coating comprising a colloidized mixture of shellac and an organic substance of low volatility which enhances the flexibility thereof.

2. A protected motion picture film comprising a flexible transparent support, a gelatin image-bearing layer on said support, and a flexible transparent protective coating over said layer and firmly adherent thereto, said coating comprising shellac and a lower monohydroxy aliphatic alcohol containing from 4 to 5 carbon atoms, said film having sprocket-engaging perforations adjacent its margins substantially free from obstruction by said coating.

Signed at Rochester, New York this 15th day of June, 1923.

LESTER J. MALONE.